(12) United States Patent
Lee et al.

(10) Patent No.: US 10,275,146 B2
(45) Date of Patent: Apr. 30, 2019

(54) VIRTUAL NAVIGATION APPARATUS, NAVIGATION METHOD, AND NON-TRANSITORY COMPUTER READABLE MEDIUM THEREOF

(71) Applicant: Pixart Imaging Inc., Hsin-Chu (TW)

(72) Inventors: Yin-Hui Lee, Hsin-Chu (TW); Yen-Min Chang, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 132 days.

(21) Appl. No.: 13/935,876

(22) Filed: Jul. 5, 2013

(65) Prior Publication Data

US 2014/0232666 A1    Aug. 21, 2014

(30) Foreign Application Priority Data

Feb. 19, 2013  (TW) .............................. 102105657 A

(51) Int. Cl.
*G06F 3/041* (2006.01)
*G06F 3/0488* (2013.01)
*G06F 3/0484* (2013.01)

(52) U.S. Cl.
CPC ........ *G06F 3/04883* (2013.01); *G06F 3/0484* (2013.01); *G06F 2203/04808* (2013.01)

(58) Field of Classification Search
CPC ................. G06F 3/041; G06F 3/04892; G06F 2203/04808; G06F 3/0481; G06F 3/04883;

(Continued)

(56) References Cited

U.S. PATENT DOCUMENTS 7,728,823 B2 *  6/2010  Lyon et al. .................... 345/173
8,407,606 B1 *  3/2013  Davidson et al. ............ 715/754

(Continued)

FOREIGN PATENT DOCUMENTS

CN    101308417 A    11/2008
CN    101661363 A    3/2010

(Continued)

OTHER PUBLICATIONS

China Office Action dated Jun. 8, 2016.

(Continued)

*Primary Examiner* — Sardis F Azongha
(74) *Attorney, Agent, or Firm* — McClure, Qualey & Rodack, LLP

(57) ABSTRACT

A virtual navigation apparatus, a navigation method, and a non-transitory computer readable medium thereof are provided. The virtual navigation apparatus includes a work surface, a touch detection module, and a processor. The touch detection module is electrically connected to the work surface and the processor. The touch detection module is configured to detect a plurality of detection data within a time interval. The processor determines that at least three touch objects touch the work surface within the time interval. The processor determines the movement datum of each touch object according to the detection data. The processor determines a position signal according to the movement data so that a host can move the cursor on a screen according to the position signal.

42 Claims, 10 Drawing Sheets

(58) Field of Classification Search
CPC .... G06F 3/0484; G06F 3/1454; G06F 3/0412; G06F 3/0414; G06F 3/0416; G06F 3/0421; G06F 3/044; G06F 3/045
See application file for complete search history.

(56) References Cited

U.S. PATENT DOCUMENTS

| | | | |
|---|---|---|---|
| 2010/0053094 A1 | 3/2010 | Kong et al. | |
| 2010/0162181 A1* | 6/2010 | Shiplacoff | G06F 3/0485 715/863 |
| 2010/0283750 A1* | 11/2010 | Kang | G06F 3/0416 345/173 |
| 2011/0007027 A1 | 1/2011 | Chen et al. | |
| 2011/0109552 A1 | 5/2011 | Yasutake | |
| 2012/0188189 A1* | 7/2012 | Deluca | G06F 3/041 345/173 |
| 2012/0206375 A1* | 8/2012 | Fyke et al. | 345/173 |
| 2012/0249487 A1 | 10/2012 | Cai et al. | |
| 2012/0306782 A1* | 12/2012 | Seo et al. | 345/173 |
| 2013/0082946 A1* | 4/2013 | Park | G06F 3/04847 345/173 |
| 2013/0127719 A1* | 5/2013 | Yasutake | 345/163 |
| 2013/0335333 A1* | 12/2013 | Kukulski et al. | 345/173 |
| 2014/0168097 A1* | 6/2014 | Oh | 345/173 |

FOREIGN PATENT DOCUMENTS

| | | |
|---|---|---|
| CN | 101950212 A | 1/2011 |
| CN | 202120234 U | 1/2012 |
| TW | 201218036 A1 | 5/2012 |
| TW | 201239740 A1 | 10/2012 |

OTHER PUBLICATIONS

English translation (by machine) of China Office Action dated Jun. 8, 2016.
Taiwan Office Action dated Dec. 23, 2014.
English translation (by machine) of Taiwan Office Action dated Dec. 23, 2014.

* cited by examiner

VIRTUAL NAVIGATION APPARATUS, NAVIGATION METHOD, AND NON-TRANSITORY COMPUTER READABLE MEDIUM THEREOF This application claims priority to Taiwan Patent Application No. 102105657 filed on Feb. 19, 2013, which is hereby incorporated by reference in its entirety.

CROSS-REFERENCES TO RELATED APPLICATIONS

Not applicable.

BACKGROUND OF THE INVENTION

Field of the Invention

The present invention relates to a virtual navigation apparatus, a navigation method, and a non-transitory computer readable medium thereof. More particular, the present invention relates to a virtual navigation apparatus, a navigation method, and a non-transitory computer readable medium thereof which eliminates the need of holding a hardware outline by hand.

Descriptions of the Related Art

Computers have become indispensable to modern people's lives. For conventional computer peripheral devices, most navigation apparatuses (e.g., mice) are used as a primary input apparatuses. Users often need to use a navigation apparatus to move the cursor shown on a monitor, or use the navigation apparatus to click the desired options, applications, etc. Therefore, navigation apparatuses have become an important bridge of communication between users and computers. However, navigation apparatuses occupy a certain space and mostly have irregular shapes, so it is very difficult to conveniently take such a navigation apparatus along with a computer when a user goes out.

Accordingly, it is important to provide a navigation apparatus that can be easily carried by the user.

SUMMARY OF THE INVENTION

To solve the aforesaid problem, the present invention provides a virtual navigation apparatus, a navigation method, and a non-transitory computer readable medium thereof.

The virtual navigation apparatus of the present invention comprises a work surface, a touch detection module, and a processor. The touch detection module is electrically connected to the work surface and the processor. The touch detection module is configured to detect a plurality of detection data within a time interval. The processor is configured to determine that at least three touch objects touch the work surface within the time interval according to the plurality of detection data. The processor is further configured to determine a movement datum for each touch object according to the plurality of detection data, and decide a position signal according to the plurality of movement data so that a host moves a cursor on a screen according to the position signal.

The navigation method of the present invention is adapted to be used in a virtual navigation apparatus. The virtual navigation apparatus comprises a work surface, a touch detection module, and a processor. The navigation method comprises the following steps: (a) detecting a plurality of detection data within a time interval via the touch detection module, (b) determining that at least three touch objects touch the work surface within the time interval according to the plurality of detection data via the processor, (c) determining a movement datum for each touch object according to the plurality of detection data via the processor, and (d) deciding a position signal according to the plurality of movement data via the processor so that a host can move a cursor on a screen according to the position signal.

The non-transitory computer readable medium of the present invention has a computer program stored therein. The computer program executes a navigation method after being loaded into a virtual navigation apparatus. The computer program comprises code A, code B, code C, and code D. Code A is for detecting a plurality of detection data within a time interval via a touch detection module of the virtual navigation apparatus. Code B is for determining that at least three touch objects touch the work surface within the time interval according to the plurality of detection data via a processor of the virtual navigation apparatus. Code C is for determining a movement datum for each touch object according to the plurality of detection data via the processor. Code D is for deciding a position signal according to the plurality of movement data via the processor so that a host can move a cursor on a screen according to the position signal.

As can be known from the above descriptions, the present invention achieves the purpose of navigation by means of an apparatus with a work surface, a touch detection module, and a processor. According to the present invention, a plurality of detection data is detected by the touch detection module. A determination of whether at least three touch objects touch the work surface within a time interval is given according to the plurality of detection data. If at least three touch objects touch the work surface within a time interval, then a position signal is further decided so that a host can move a cursor on a screen according to the position signal. Since the present invention achieves the purpose of navigation by an apparatus with a work surface, a touch detection module, and a processor and such an apparatus does not have the outline of a conventional mouse or an optical mouse, the apparatus can be conveniently carried by the user.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, a virtual navigation apparatus, a navigation method and a non-transitory computer readable medium thereof of the present invention will be explained with reference to embodiments thereof. However, these embodiments are not intended to limit the present invention to any environments, applications or implementations described in these embodiments. Therefore, the description of these embodiments is only for the purpose of illustration rather than to limit the present invention. It shall be appreciated that in the following embodiments and attached drawings, elements not directly related to the present invention are omitted from depiction.

Figure 1A:
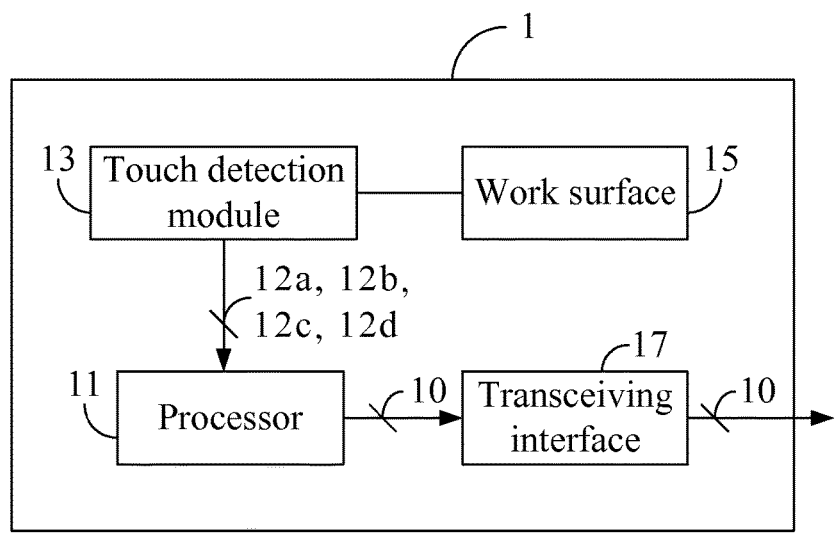
FIG. 1A is a schematic view depicting a virtual navigation apparatus of the first embodiment.

The first embodiment of the present invention is a virtual navigation apparatus 1 and a schematic view of which is depicted in FIG. 1A. The virtual navigation apparatus 1 comprises a processor 11, a touch detection module 13, a work surface 15, and a transceiving interface 17. The touch detection module 13 is electrically connected to the processor 11 and the work surface 15, wherein the processor 11 is electrically connected to the transceiving interface 17.

The processor 11 may be any processor, central processing unit (CPUs), microprocessor or other computing units well known to those of ordinary skill in the art. The work surface 15 may be a planar surface or a nonplanar surface (e.g., an ergonomic cambered surface suitable for placement of a human finger). The touch detection module 13 corresponds to the work surface 15, and may be capacitive, resistive, optical, piezoelectric, or some other type of touch detection module. These different types of touch detection modules and operations thereof are well known to those of ordinary skill in the art, and thus, will not be further described herein. Furthermore, the transceiving interface 17 may be any transceiving interfaces that are well known to those of ordinary skill in the art.

Figure 1B:
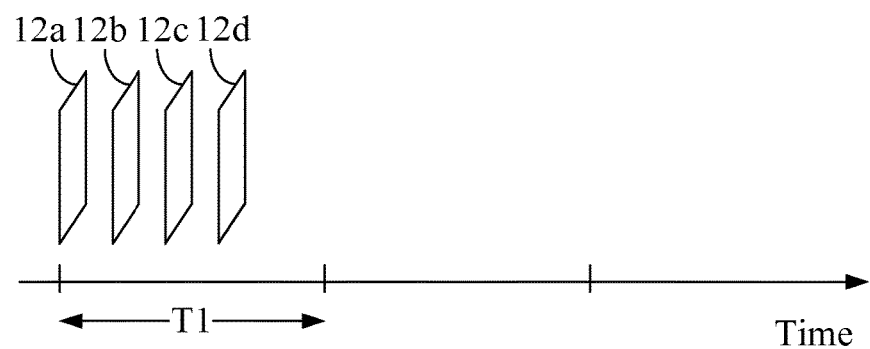
FIG. 1B is a schematic view depicting detection data detected by the touch detection module.

In this embodiment, the touch detection module 13 detects a plurality of detection data 12a, 12b, 12c, 12d within a time interval T1 as shown in FIG. 1B. It shall be readily understood by those of ordinary skill in the art that different types of detection data 12a, 12b, 12c, 12d will be detected by different types of touch detection modules 13. Next, the processor 11 determines that at least three touch objects touch the work surface 15 within the time interval T1 according to the detection data 12a, 12b, 12c, 12d. Thereafter, the processor 11 determines a movement datum for each touch object according to the detection data 12a, 12b, 12c, 12d and decides a position signal 10 according to the plurality of movement data. If the transceiving interface 17 is connected to a host (not shown), then the transceiving interface 17 will transmit the position signal 10 to the host so that the host can move a cursor on the screen according to the position signal 10.

In other implementations, if the virtual navigation apparatus 1 further comprises a screen or the touch detection module 13 is a touch screen, then the position signal 10 decided by the processor 11 may also be used to move a cursor on the screen of the virtual navigation apparatus 1. In such implementations, the virtual navigation apparatus 1 is not connected to an external host, so the transceiving interface 17 may be omitted.

Next, the method in which this embodiment decides the position signal 10 will be described with reference to a case where the at least three touch objects comprise a first touch object, a second touch object and a third touch object.

Figure 1C:
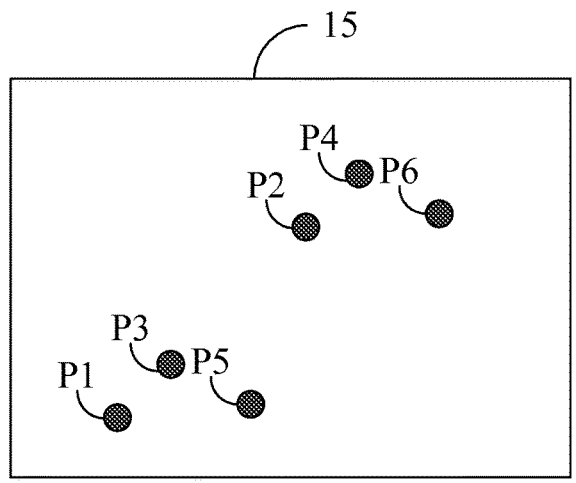
FIG. 1C is a schematic view depicting the positional movement of the touch objects on a work surface.

The processor 11 determines that the first touch object moves from a position P1 on the work surface 15 to a position P2 on the work surface 15, the second touch object moves from a position P3 on the work surface 15 to a position P4 on the work surface 15, and the third touch object moves from a position P5 on the work surface 15 to a position P6 on the work surface 15 within the time interval T1 according to the detection data 12a, 12b, 12c, 12d, as shown in FIG. 1C. The processor 11 calculates a first distance between the position P1 and the position P2, a second distance between the position P3 and the position P4, and a third distance between the position P5 and the position P6. Thereafter, the processor 11 calculates an average value of the first distance, the second distance, and the third distance and sets the position signal 10 to be the average value. In brief, the processor 11 sets the position signal 10 to be an average value of the lengths of the moving tracks of the first touch object, the second touch object, and the third touch object.

In other implementations, the processor 11 may change to determine that the first touch object moves from a position P1 on the work surface 15 to a position P2 on the work surface 15, the second touch object moves from a position P3 on the work surface 15 to a position P4 on the work surface 15, and the third touch object moves from a position P5 on the work surface 15 to a position P6 on the work surface 15 within the time interval T1 according to the detection data 12a, 12b, 12c, 12d, as shown in FIG. 1C. The processor 11 calculates a first average value of the positions P1, P3, P5, calculates a second average value of the positions P2, P4, P6, calculates a difference value between the second average value and the first average value, and sets the position signal 10 to be the difference value. In brief, the processor 11 sets the position signal 10 to be the track length of a gravity center of the first touch object, the second touch object, and the third touch object.

Figure 1D:
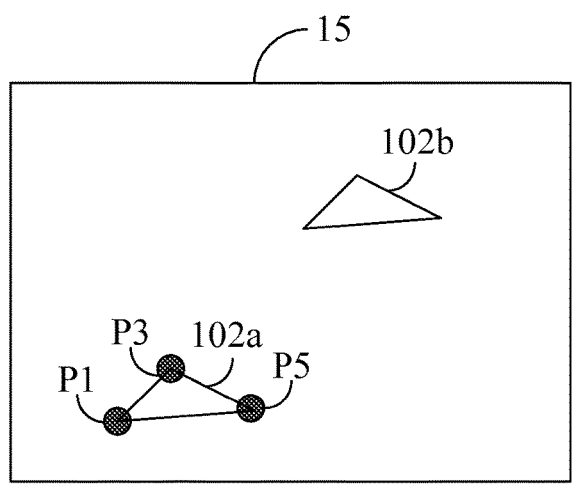
FIG. 1D is a schematic view depicting the positional movement of the touch objects on the work surface.
Figure 1E:
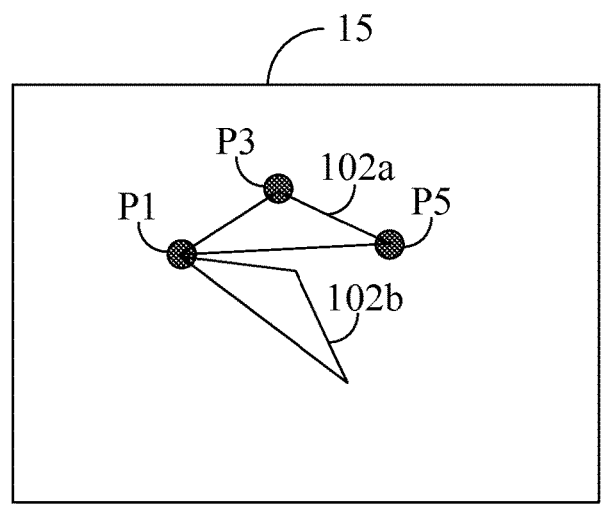
FIG. 1E is a schematic view depicting the positional movement of the touch objects on the work surface.
Figure 1F:
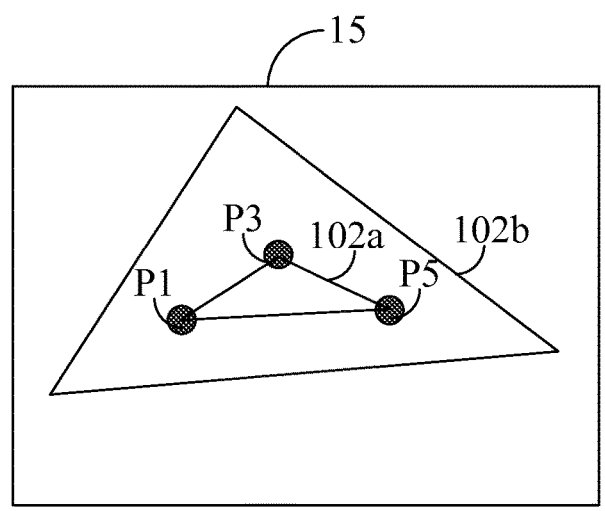
FIG. 1F is a schematic view depicting the positional movement of the touch objects on the work surface.

In other implementations, the processor 11 may change to decide the position signal 10 in other ways instead. Specifically, the processor 11 firstly defines a polygon according to a plurality of positions where the first touch object, the second touch object, and the third touch object touch the work surface 15. Then, the processor 11 decides a moving direction and a moving distance of the position signal 10 according to a change (e.g., an increase, a decrease, deformation towards different directions, or the like) of an area of the polygon within the time interval T1. Taking three different cases depicted in FIG. 1D, FIG. 1E, and FIG. 1F as examples, the processor 11 firstly defines a polygon 102a according to the positions P1, P3, P5 and then determines that the polygon 102a changes into a polygon 102b within the time interval T1. A change is determined between the areas of the polygon 102a and the polygon 102b to facilitate the moving direction and the distance comprised in the position signal 10. Specifically, the moving directions of FIG. 1D, FIG. 1E, and FIG. 1F are "towards the upper right direction", "clockwise", and "outwards", respectively.

In such implementations described in the previous paragraph, the moving direction carried in the position signal 10 is used by the host for controlling a visual variation or an audio variation. The visual variation may be a rotation, an enlargement, a shrink, or the combination thereof of a display area on the screen. The display area displays either the drawing, window, cursor, and combinations thereof. The audio variation may comprise the volume control, choice of sound effects, sound mixing, or combinations thereof. Taking FIG. 1E as an example, the moving direction determined by the processor 11 is "clockwise", so the host can increase the volume according to the moving direction and decide an increasing amount of the volume according to the moving distance. Furthermore, using FIG. 1F as an example, the moving direction determined by the processor 11 is "outwards", so the host can enlarge a picture displayed on the screen according to the moving direction and decide an enlargement factor according to the moving distance.

Figure 1G:
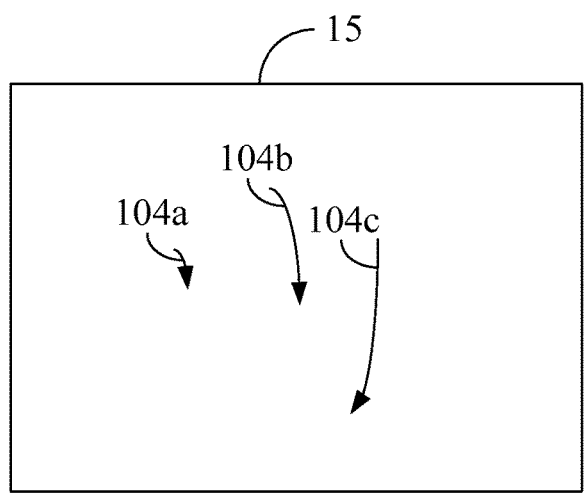
FIG. 1G is a schematic view depicting the positional movement of the touch objects on the work surface.
Figure 1H:
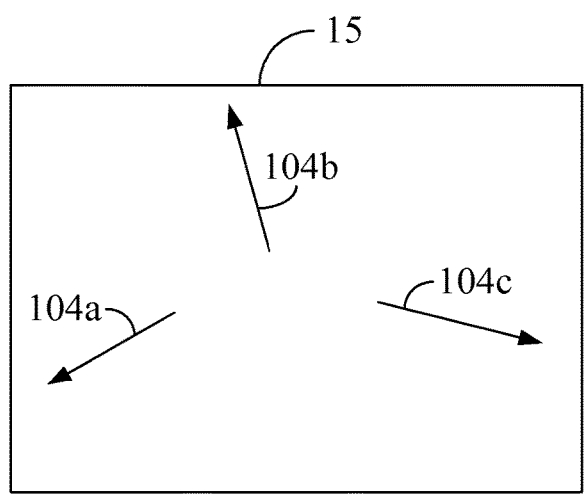
FIG. 1H is a schematic view depicting the positional movement of the touch objects on the work surface.

In other implementations, the processor 11 may change to decide the position signal 10 in other ways instead. Specifically, the processor 11 decides a moving direction comprised in the position signal 10 according to a moving track of each touch object on the work surface 15 within the time interval T1. The processor 11 further sets a moving distance comprised in the position signal 10 to be an average value of the moving tracks. Taking two different cases depicted in FIG. 1G and FIG. 1H as an example, the processor 11 decides a moving direction comprised in the position signal 10 according to moving tracks 104a, 104b, 104c of the first touch object, the second touch object, and the third touch object on the work surface 15 within the time interval T1. Specifically, the moving directions of FIG. 1G and FIG. 1H are "clockwise" and "outwards" respectively. Next, the processor 11 sets a moving distance comprised in the position signal 10 to be an average value of the moving tracks 104a, 104b, 104c. Similarly, in such implementations, the moving direction carried in the position signal 10 can be used by the host for controlling a visual variation or an audio variation.

The various ways of deciding the position signal 10 have been described with reference to the case of three touch objects; however, the method in which the processor 11 decides the position signal 10 when more than three touch objects touch the work surface 15 within the time interval T1 shall be readily devised by those of ordinary skill in the art based on the above description, and thus, will not be further described herein.

Furthermore, the virtual navigation apparatus 1 may firstly determine that each touch object on the work surface 15 is a human finger and then continue executing the subsequent operations (i.e., decide the position signal 10, and control the cursor on the screen or the visual variation and/or the audio variation on the screen according to the position signal 10). Similarly, with reference to the case where the at least three touch objects comprise a first touch object, a second touch object, and a third touch object, the method in which the touch object is determined to be a human finger will be described. The processor 11 determines that the first touch object moves from a position P1 on the work surface 15 to a position P2 on the work surface 15, the second touch object moves from a position P3 on the work surface 15 to a position P4 on the work surface 15, and the third touch object moves from a position P5 on the work surface 15 to a position P6 on the work surface 15 within the time interval T1 according to the detection data 12a, 12b, 12c, 12d, as shown in FIG. 1C. Then, the processor 11 determines whether each of the first touch object, the second touch object, and the third touch object is a human finger according to a first spatial relation between the positions P1, P3, P5 and a second spatial relation between the positions P2, P4, P6. If each of the first touch object, the second touch object, and the third touch object is a human finger, then the processor 11 will further decide the position signal 10 and then control the cursor on the screen or the visual variation and/or the audio variation on the screen according to the position signal 10.

With the arrangement of the first embodiment, the user can control the cursor on the screen or the visual variation and/or the audio variation on the screen simply by placing touch objects (e.g., fingers) on the work surface 15 of the virtual navigation apparatus 1 and moving the touch objects on the work surface 15 without the need of holding an apparatus with a hardware outline by hand. Furthermore, the virtual navigation apparatus 1 may further be designed to execute the subsequent operations according to the position signal 10 only when the touch object on the work surface 15 is a human finger. As a result, misoperations caused by something other than a human being (e.g., a pet) coming into contact with the work surface 15 can be avoided.

Figure 2A:
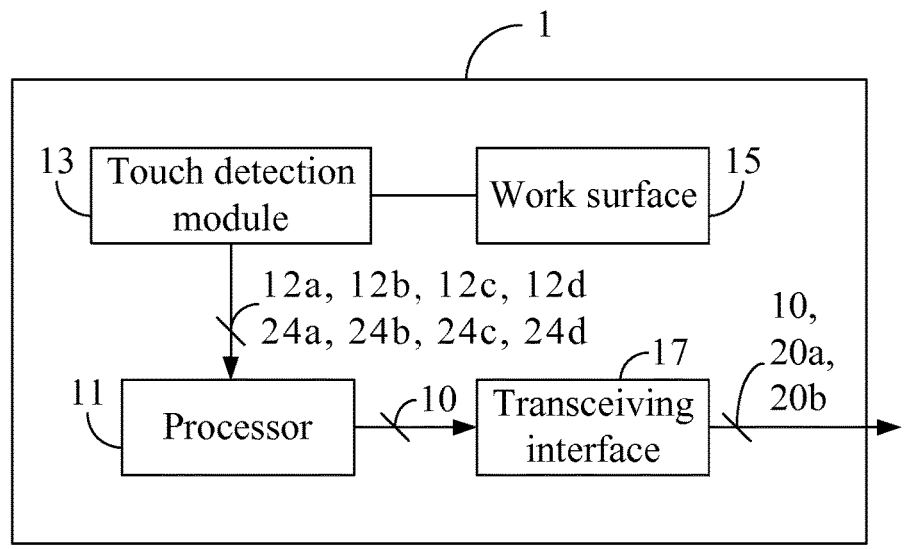
FIG. 2A is a schematic view depicting a virtual navigation apparatus of the second embodiment and third embodiment.
Figure 2B:
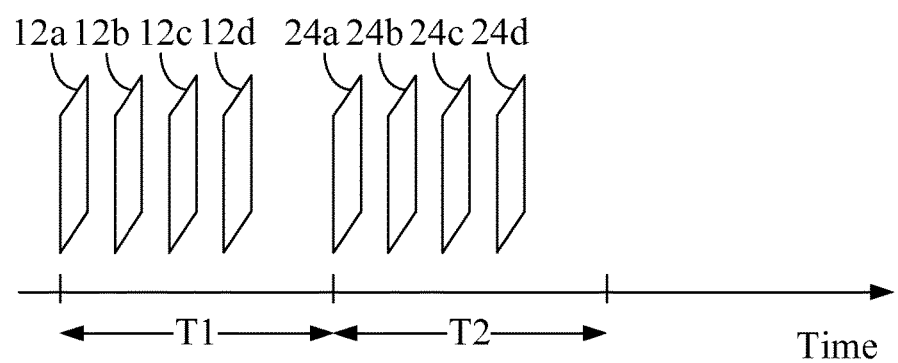
FIG. 2B is a schematic view depicting the detection data detected by a touch detection module.

The second embodiment of the present invention is shown in FIG. 2A and FIG. 2B. The virtual navigation apparatus 1 in the second embodiment can also execute all the operations and functions that can be executed in the first embodiment. However, in the second embodiment, the virtual navigation apparatus 1 continues operating within a time interval T2 later than the time interval T1. Hereinbelow, only differences between the second embodiment and the first embodiment will be detailed.

Similar to the first embodiment, the touch detection module 13 detects a plurality of detection data 12a, 12b, 12c, 12d within the time interval T1, as shown in FIG. 2B. Next, the processor 11 determines that at least three touch objects (e.g., a first touch object, a second touch object, and a third touch object) touch the work surface 15 within the time interval T1 according to the detection data 12a, 12b, 12c, 12d. Thereafter, the processor 11 determines a movement datum for each touch object according to the detection data 12a, 12b, 12c, 12d and decides a position signal 10 according to the plurality of movement data. At this point, the navigation function of the virtual navigation apparatus 1 has been activated.

After the navigation function of the virtual navigation apparatus 1 has been activated, the touch detection module 13 detects a plurality of detection data 24a, 24b, 24c, 24d within the time interval T2 later than the time interval T1. There are multiple different cases depending on the contents of the detection data 24a, 24b, 24c, 24d, which will be illustrated as follows.

Now, the first case will be described firstly. The processor 11 determines that the first touch object, the second touch object, the third touch object, and a fourth touch object touch the work surface 15 within the time interval T2 according to the detection data 24a, 24b, 24c, 24d. The processor 11 decides an operation signal 20a after determining that the fourth touch object touches the work surface 15 within the time interval T2. The transceiving interface 17 transmits the operation signal 20a to the host so that the host performs an operation according to the operation signal 20a. In brief, as the navigation function of the virtual navigation apparatus 1 has been activated within the time interval T1 in the first case, an operation signal 20a that allows the host to perform proper operations will be generated by the virtual navigation apparatus 1 if another touch object (e.g., the fourth touch object) is added in the subsequent time interval T2.

Next, a second case will be described. The processor 11 determines that the first touch object, the second touch object, the third touch object, and the fourth touch object touch the work surface 15 within the time interval T2 according to the detection data 24a, 24b, 24c, 24d. The processor 11 decides an operation signal 20a after determining that the fourth touch object touches the work surface 15 within the time interval T2. Furthermore, the processor 11 decides an operation signal 20b after determining that the first touch object, the second touch object, and the third touch object touch the work surface 15 within the time interval T2. Thereafter, the transceiving interface 17 transmits the operation signals 20a, 20b to the host so that the host performs a first operation and a second operation according to the operation signals 20a, 20b respectively.

In brief, in the second case, the navigation function of the virtual navigation apparatus 1 has been activated within the time interval T1. Therefore, if another touch object (e.g., the fourth touch object) is added in the subsequent time interval T2, then the virtual navigation apparatus 1 will perform different operations according to the movement of the original touch objects and the newly added touch object. For example, the user firstly moves his three fingers of the right hand on the work surface 15 within the time interval T1 and then moves one finger of the left hand on the work surface 15 within the subsequent time interval T2 in addition to the three fingers of the right hand. The user can make the host perform different operations simultaneously depending on the movement of the fingers of the user within the time interval T2 (e.g., the user increases the volume of the host through the movement of the right hand and changes the position of an image on the screen through the movement of the left hand).

Next, a third case will be described. The processor 11 determines that a fourth touch object touches the work surface 15 within the time interval T2 according to the detection data 24a, 24b, 24c, 24d. The processor 11 further decides an operation signal 20a after determining that the fourth touch object touches the work surface 15. Thereafter, the transceiving interface 17 transmits the operation signal 20a to the host so that the host performs an operation according to the operation signal 20a. In brief, as the navigation function of the virtual navigation apparatus 1 has been activated within the time interval T1 in the third case, an operation signal 20a that allows the host to perform proper operations will be generated by the virtual navigation apparatus 1 if another touch object (e.g., the fourth touch object) is added and the original three touch objects (e.g., the first touch object, the second touch object and the third touch object) have moved away from the work surface 15 in the subsequent time interval T2.

With the arrangement of the second embodiment, the user can perform more different operations simply by providing at least one additional touch object (e.g., the fourth touch object) moving on the work surface 15 after the navigation function of the virtual navigation apparatus 1 has been activated. Furthermore, even if the original touch objects (e.g., the first touch object, the second touch object and the third touch object) have moved away from the work surface 15, an operation signal 20a that allows the host to perform proper operations can still be generated by the virtual navigation apparatus 1 according to the way in which the additional touch object moves on the work surface 15.

With continued reference to FIGS. 2A and 2B for the third embodiment of the present invention, the operations performed by the virtual navigation apparatus 1 in the third embodiment are similar to those in the second embodiment, so only the differences between the third embodiment and the second embodiment will be detailed hereinbelow.

In the second embodiment, the user can perform more different operations simply by providing at least one additional touch object moving on the work surface 15 after the navigation function of the virtual navigation apparatus 1 has been activated. However, in the third embodiment, the user needs to add at least three additional touch objects moving on the work surface 15 after the navigation function of the virtual navigation apparatus 1 has been activated. In other words, in the third embodiment, the execution of each newly added operation requires at least three touch objects moving on the work surface 15.

Specifically, after the navigation function of the virtual navigation apparatus 1 has been activated, the touch detection module 13 detects a plurality of detection data 24a, 24b, 24c, 24d within the time interval T2 later than the time interval T1. There are multiple different cases depending on the contents of the detection data 24a, 24b, 24c, 24d, which will be illustrated as follows.

Now, the first case will be described firstly. The processor 11 determines that the first touch object, the second touch object, the third touch object, a fourth touch object, a fifth touch object, and a sixth touch object touch the work surface 15 within the time interval T2 according to the detection data 24a, 24b, 24c, 24d. The processor 11 decides an operation signal 20a after determining that the fourth touch object, the fifth touch object, and the sixth touch object touch the work surface 15 within the time interval T2. The transceiving interface 17 transmits the operation signal 20a to the host so that the host performs an operation according to the operation signal 20a.

Next, the second case will be described. The processor 11 determines that the first touch object, the second touch object, the third touch object, the fourth touch object, the fifth touch object, and the sixth touch object touch the work surface 15 within the time interval T2 according to the detection data 24a, 24b, 24c, 24d. The processor 11 decides an operation signal 20a after determining that the fourth touch object, the fifth touch object, and the sixth touch object touch the work surface 15 within the time interval T2. Furthermore, the processor 11 decides an operation signal 20b after determining that the first touch object, the second touch object, and the third touch object touch the work surface 15 within the time interval T2. Thereafter, the transceiving interface 17 transmits the operation signals 20a, 20b to the host so that the host performs a first operation and a second operation according to the operation signals 20a, 20b respectively.

Next, the third case will be described. The processor 11 determines that the fourth touch object, the fifth touch object, and the sixth touch object touch the work surface 15 within the time interval T2 according to the detection data 24a, 24b, 24c, 24d. The processor 11 further decides an operation signal 20a after determining that the fourth touch object, the fifth touch object, and the sixth touch object touch the work surface 15. Thereafter, the transceiving interface 17 transmits the operation signal 20a to the host so that the host can perform an operation according to the operation signal 20a.

In addition to the aforesaid operations, the third embodiment can also execute all the operations and functions set forth in the first embodiment and the second embodiment. The method in which the third embodiment executes these operations and functions can be readily appreciated by those of ordinary skill in the art based on the explanation of the first embodiment and the second embodiment, and thus, will not be further described herein.

With the arrangement of the third embodiment, after the navigation function of the virtual navigation apparatus 1 has been activated, the user needs an additional operation to provide at least three additional touch objects (e.g., the fourth touch object, the fifth touch object, and the sixth touch object) moving on the work surface 15. Furthermore, even if the original touch objects (e.g., the first touch object, the second touch object, and the third touch object) have moved away from the work surface 15, an operation signal 20a that allows the host to perform proper operations can still be generated by the virtual navigation apparatus 1 according to the way in which the other touch objects move on the work surface 15.

Figure 3A:
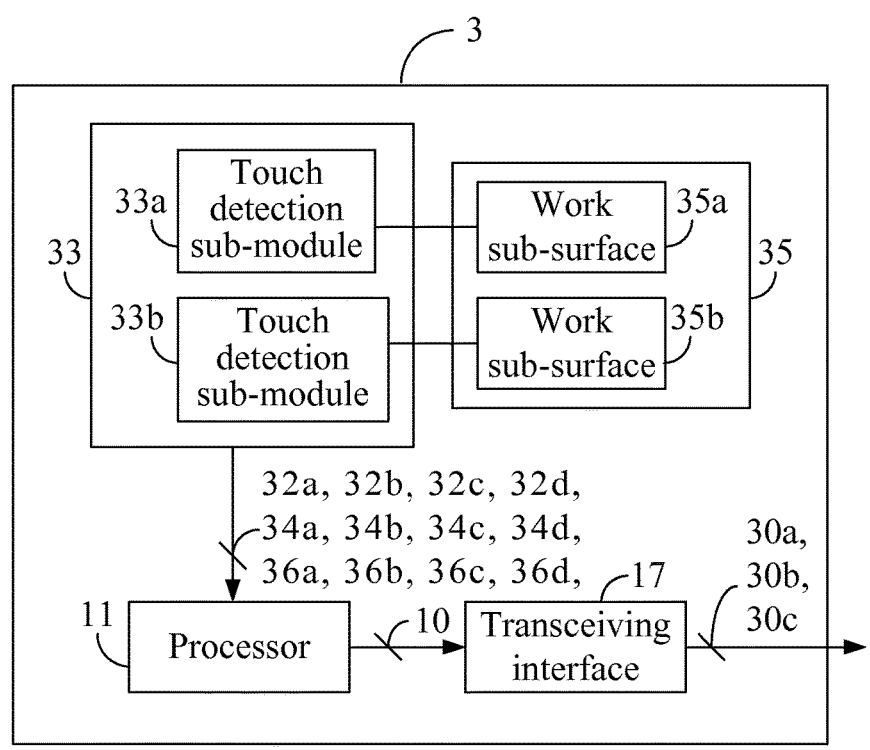
FIG. 3A is a schematic view depicting a virtual navigation apparatus of the fourth embodiment and fifth embodiment.

The fourth embodiment of the present invention is a virtual navigation apparatus 3; a schematic view of which is depicted in FIG. 3A. The virtual navigation apparatus 3 comprises a processor 11, a touch detection module 33, a work surface 35, and a transceiving interface 17. The touch detection module 33 is electrically connected to the processor 11 and the work surface 35. The processor 11 is electrically connected to the transceiving interface 17. In this embodiment, the touch detection module 33 comprises touch detection sub-modules 33a, 33b, while the work surface 35 comprises work sub-surfaces 35a, 35b which do not overlap. Furthermore, the touch detection sub-module 33a corresponds to the work sub-surface 35a, while the touch detection sub-module 33b corresponds to the work sub-surface 35b. The operations that can be executed by the processor 11 and the transceiving interface 17 in the fourth embodiment are the same as those in the first to the third embodiments, and thus, will not be further described herein.

Figure 3B:
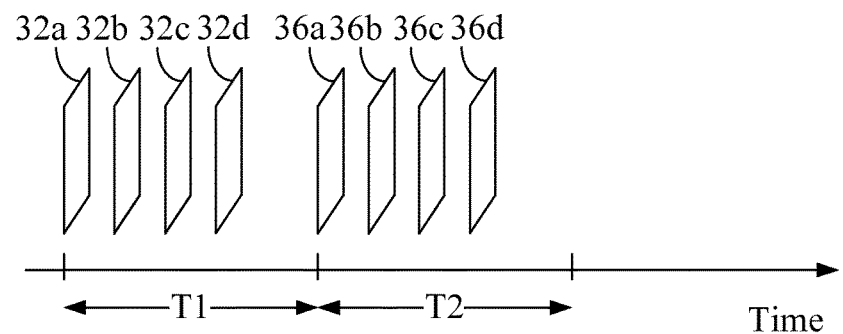
FIGS. 3B and 3C are schematic views depicting detection data detected by a touch detection module.
Figure 3C:
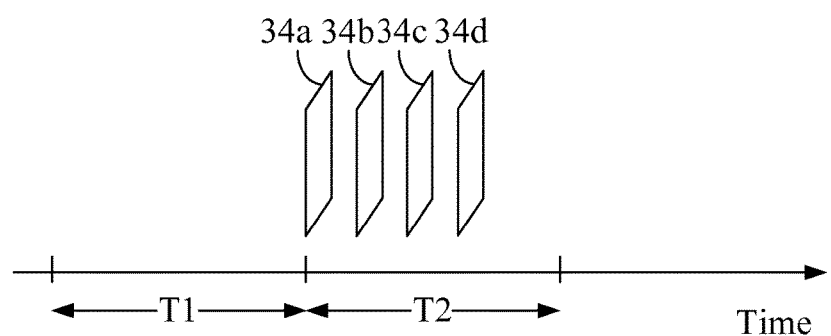

FIG. 3B depicts a detection signal detected by the touch detection sub-module 33a, while FIG. 3C depicts a detection signal detected by the touch detection sub-module 33b. Specifically, the touch detection sub-module 33a detects a plurality of detection data 32a, 32b, 32c, 32d within the time interval T1 as shown in FIG. 3B. Then, the processor 11 determines that at least three touch objects (e.g., the first touch object, the second touch object, and the third touch object) touch the work sub-surface 35a within the time interval T1 according to the detection data 32a, 32b, 32c, 32d. Thereafter, the processor 11 determines a movement datum for each touch object according to the detection data 32a, 32b, 32c, 32d, and decides a position signal 30a according to the movement data. At this point, the navigation function of the virtual navigation apparatus 3 has been activated.

Similar to the second embodiment, the navigation function of the virtual navigation apparatus 3 is still active within the time interval T2 later than the time interval T1.

The touch detection sub-module 33b detects a plurality of detection data 34a, 34b, 34c, 34d within the time interval T2, as shown in FIG. 3C. The processor 11 determines that a fourth touch object touches the work sub-surface 35b within the time interval T2 according to the detection data 34a, 34b, 34c, 34d. The processor 11 decides an operation signal 30b after determining that the fourth touch object touches the work sub-surface 35b. The transceiving interface 17 transmits the operation signal 30b to the host so that the host performs a first operation according to the operation signal 30b.

On the other hand, the touch detection sub-module 33a detects a plurality of detection data 36a, 36b, 36c, 36d within the time interval T2. The processor 11 determines that the first touch object, the second touch object, and the third touch object touch the work sub-surface 35a within the time interval T2 according to the detection data 36a, 36b, 36c, 36d. The processor 11 further decides an operation signal 30c after determining that the first touch object, the second touch object, and the third touch object touch the work sub-surface 35a within the time interval T2. The transceiving interface 17 transmits the operation signal 30c to the host so that the host performs the second operation according to the operation signal 30c.

In addition to the aforesaid operations, the fourth embodiment can also execute all the operations and functions set forth in the first embodiment and the second embodiment except that the touch detection module 33 of the fourth embodiment comprises the touch detection sub-modules 33a, 33b and the work surface 35 comprises the work sub-surfaces 35a, 35b. The method in which the fourth embodiment executes these operations and functions can be readily appreciated by those of ordinary skill in the art based on the explanation of the first embodiment and the second embodiment, and thus, will not be further described herein.

With continued reference to FIGS. 3A, 3B, and 3C in the fifth embodiment of the present invention, the operations executed by the virtual navigation apparatus 3 in the fifth embodiment are similar to those in the fourth embodiment, so only the differences between the fifth embodiment and the fourth embodiment will be detailed hereinbelow.

In the fourth embodiment, the user can perform more different operations simply by providing at least one additional touch object moving on the other work sub-surface after the navigation function of the virtual navigation apparatus 3 has been activated. However, in the fifth embodiment, the user needs to add at least three additional touch objects moving on the other work sub-surface after the navigation function of the virtual navigation apparatus 3 has been activated. In other words, in the fifth embodiment, the execution of each newly added operation requires at least three touch objects moving on the work sub-surface.

Specifically, the touch detection sub-module 33a detects a plurality of detection data 32a, 32b, 32c, 32d within the time interval T1 as shown in FIG. 3B. Then, the processor 11 determines that at least three touch objects (e.g., the first touch object, the second touch object and the third touch object) touch the work sub-surface 35a within the time interval T1 according to the detection data 32a, 32b, 32c, 32d. Thereafter, the processor 11 determines a movement datum for each touch object according to the detection data 32a, 32b, 32c, 32d, and decides a position signal 30a according to the movement data. At this point, the navigation function of the virtual navigation apparatus 3 has been activated.

The touch detection sub-module 33b detects a plurality of detection data 34a, 34b, 34c, 34d within the time interval T2 later than the time interval T1 as shown in FIG. 3C. The processor 11 determines that a fourth touch object, a fifth touch object, and a sixth touch object touch the work sub-surface 35b within the time interval T2 according to the detection data 34a, 34b, 34c, 34d. The processor 11 decides an operation signal 30b after determining that the fourth touch object, the fifth touch object, and the sixth touch object touch the work sub-surface 35b. The transceiving interface 17 transmits the operation signal 30b to the host so that the host performs a first operation according to the operation signal 30b.

On the other hand, the touch detection sub-module 33a detects a plurality of detection data 36a, 36b, 36c, 36d within the time interval T2. The processor 11 determines that the first touch object, the second touch object, and the third touch object touch the work sub-surface 35a within the time interval T2 according to the detection data 36a, 36b, 36c, 36d. The processor 11 further decides an operation signal 30c after determining that the first touch object, the second touch object, and the third touch object touch the work sub-surface 35a within the time interval T2. The transceiving interface 17 transmits the operation signal 30c to the host so that the host performs a second operation according to the operation signal 30c.

In addition to the aforesaid operations, the fifth embodiment can also execute all the operations and functions set forth in the fourth embodiment. The method in which the fifth embodiment executes these operations and functions can be readily appreciated by those of ordinary skill in the art based on the explanation of the fourth embodiment, and thus, will not be further described herein.

Figure 4A:
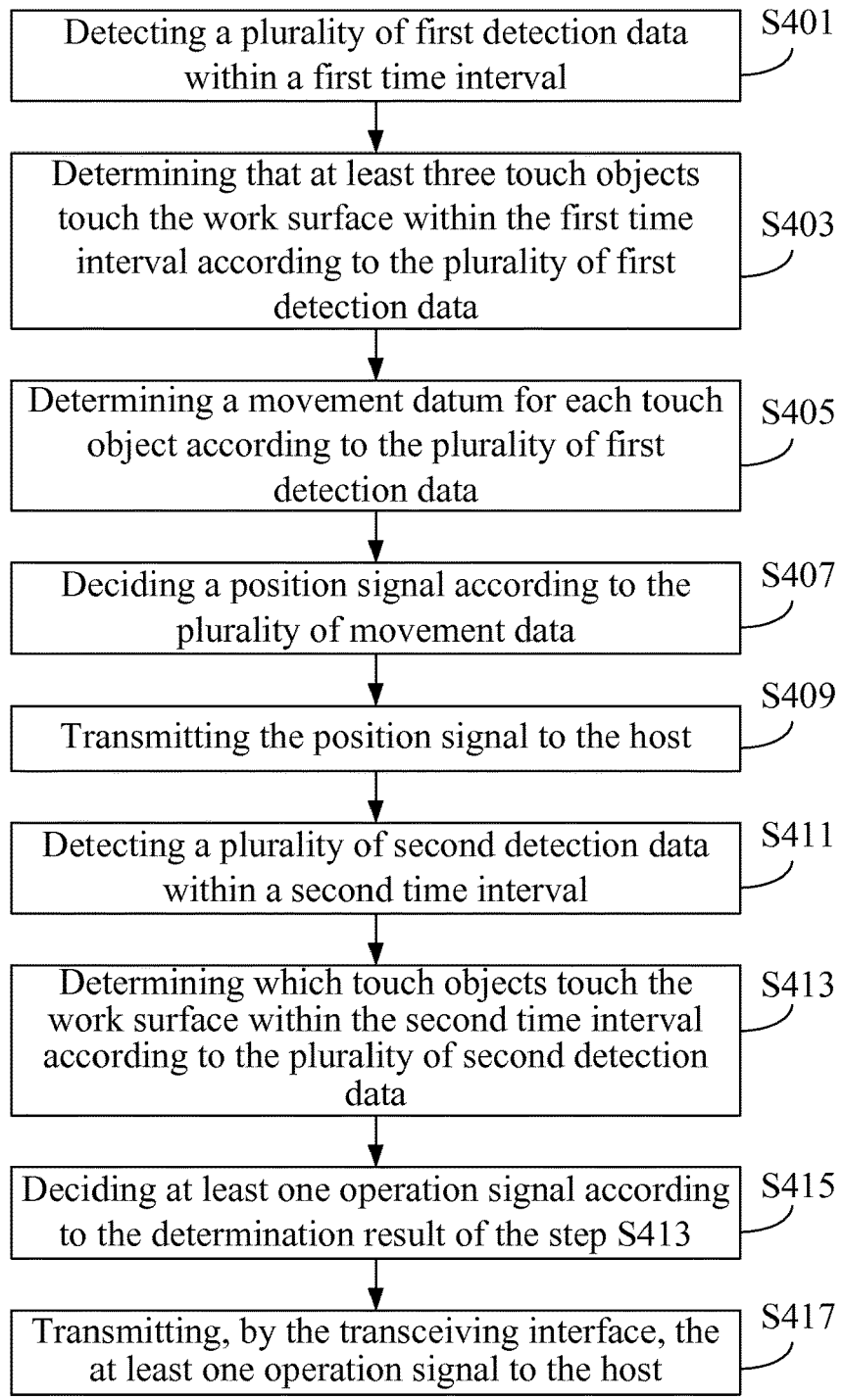
FIGS. 4A, 4B, and 4C are flowchart diagrams of a method of the sixth embodiment.
Figure 4B:
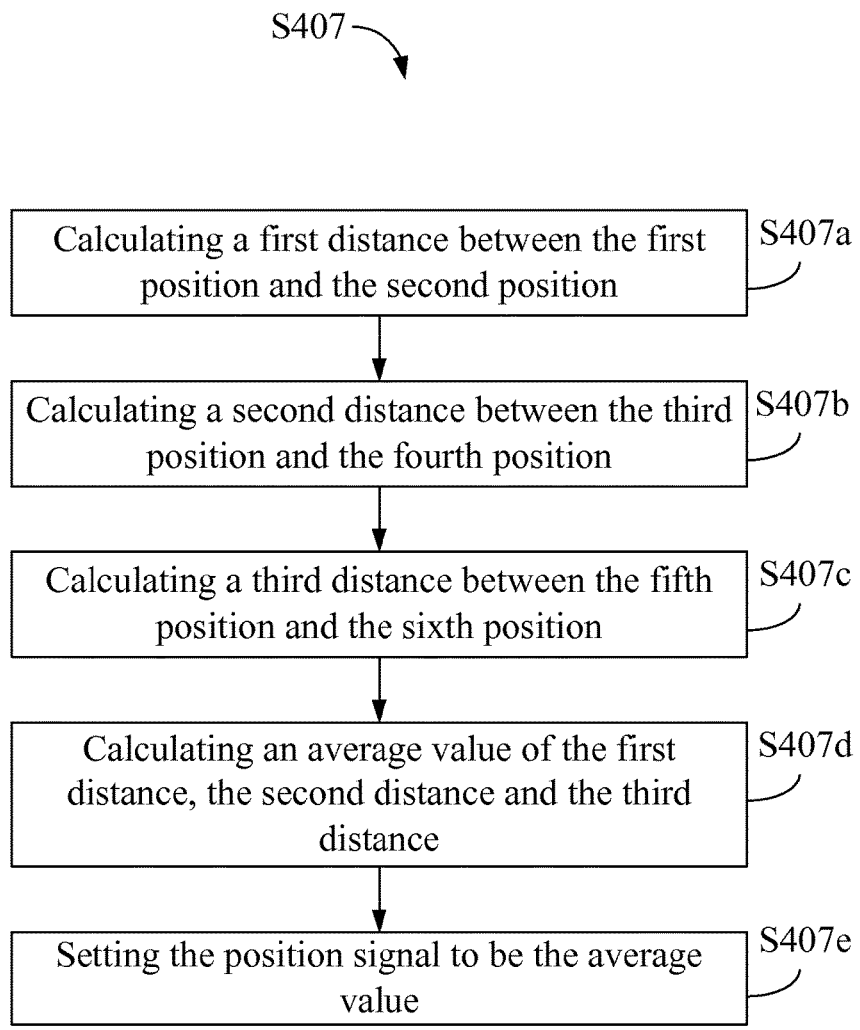

The sixth embodiment of the present invention is a navigation method and flowchart diagrams of which are depicted in FIG. 4A and FIG. 4B. The navigation method is adapted to be used in a virtual navigation apparatus (e.g., the virtual navigation apparatuses 1, 3). The virtual navigation apparatus comprises a work surface, a touch detection module, and a processor.

First, step S401 is executed to detect a plurality of first detection data within a first time interval, by the touch detection module. Next, step S403 is executed to determine that at least three touch objects (e.g., a first touch object, a second touch object, and a third touch object) touch the work surface within the first time interval according to the plurality of first detection data by the processor. Thereafter, step S405 is executed to determine the movement datum for each touch object according to the plurality of first detection data via the processor. Afterwards, step S407 is executed to decide the position signal according to the plurality of movement data via the processor.

If the virtual navigation apparatus further comprises a transceiving interface and is used to control a host, then the navigation method may further comprise step S409, which is executed to transmit the position signal to the host by the transceiving interface. Thus, the host can move a cursor on a screen according to the position signal. In other implementations, if the virtual navigation apparatus 1 comprises a screen or the touch detection module thereof is a touch screen, then the position signal decided in the step S407 may also be used to move a cursor on the screen of the virtual navigation apparatus. In such implementations, the virtual navigation apparatus is not connected to an external host, so step S409 may be omitted.

Next, various ways of deciding the position signal will be described with reference to a case where the at least three touch objects comprise a first touch object, a second touch object, and a third touch object.

In some implementations, step S405 is executed to determine, by the processor, that the first touch object moves from a first position on the work surface to a second position on the work surface, the second touch object moves from a third position on the work surface to a fourth position on the work surface, and the third touch object moves from a fifth position on the work surface to a sixth position on the work surface within the first time interval according to the plurality of first detection data detected in the step S401. Furthermore, step S407 may be accomplished through the process flow depicted in FIG. 4B.

Specifically, step S407a is executed to calculate a first distance between the first position and the second position via the processor. Next, step S407b is executed to calculate a second distance between the third position and the fourth position via the processor. Thereafter, step S407c is executed to calculate a third distance between the fifth position and the sixth position via the processor. It shall be appreciated that the order of execution for steps S407a, S407b, S407c may be exchanged. Thereafter, step S407d is executed to calculate an average value of the first distance, the second distance, and the third distance via the processor. Then, step S407e is executed to set the position signal to be the average value calculated in the step S407d via the processor.

Figure 4C:
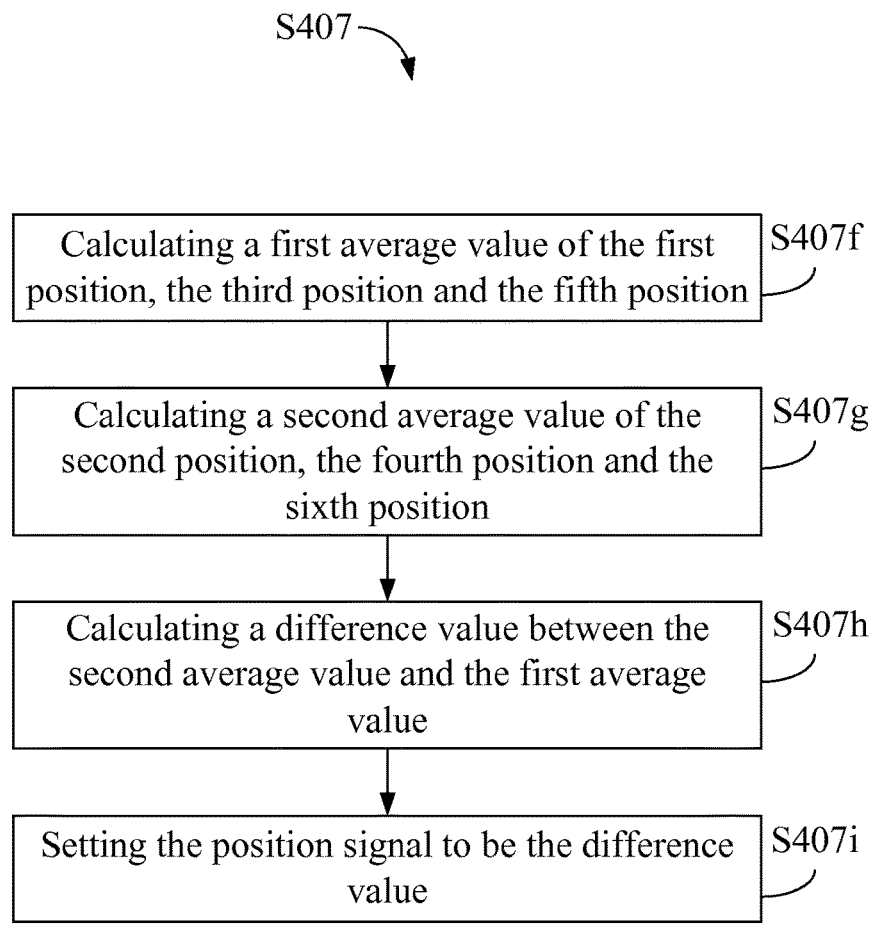

In some implementations, step S405 is also executed to determine, by the processor, that the first touch object moves from a first position on the work surface to a second position on the work surface, the second touch object moves from a third position on the work surface to a fourth position on the work surface, and the third touch object moves from a fifth position on the work surface to a sixth position on the work surface within the first time interval according to the plurality of first detection data detected in the step S401. Furthermore, step S407 may be accomplished through the process flow depicted in FIG. 4C.

Specifically, step S407f is executed to calculate a first average value of the first position, the third position, and the fifth position via the processor. Thereafter, step S407g is executed to calculate a second average value of the second position, the fourth position, and the sixth position via the processor. Then, step S407h is executed to calculate a difference value between the second average value and the first average value via the processor. Afterwards, step S407i is executed to set the position signal to be the difference value via the processor.

In some implementations, step S405 comprises a step (not shown) of defining a polygon according to a plurality of positions where the at least three touch objects touch the work surface via the processor. Step S405 also comprises another step (not shown) of determining, a change of an area of the polygon within the first time interval via the processor. Thereafter, step S407 is executed to decide a moving direction and a distance of the position signal according to the change of the area via the processor. The moving direction can be used by the host for controlling a visual variation and/or an audio variation. The moving distance can be used by the host for controlling the adjustment amount of the visual variation and/or the audio variation. The visual variation comprises a rotation, an enlargement, and/or a shrink of a display area on the screen. The display area displays a drawing, a window and/or a cursor. The audio variation comprises volume control, choice of sound effects, and/or sound mixing.

In some implementations, step S405 is executed to determine a moving track on the work surface within the first time interval for each of the at least three touch objects via the processor. The step S407 comprises a step (not shown) of determining a moving direction of the position signal according to the moving tracks via the processor. Furthermore, step S407 further comprises a step (not shown) of setting a moving distance of the position signal to be an average value of the moving tracks via the processor. Similarly, the moving direction can be used by the host for controlling a visual variation and/or an audio variation. The moving distance can be used by the host for controlling the adjustment amount of the visual variation and/or the audio variation.

After the various ways of deciding the position signal have been described, the operations following step S409 will be described now.

Step S411 is executed to detect a plurality of second detection data within a second time interval. Thereafter, step S413 is executed to determine, by the processor, which touch objects touch the work surface within the second time interval according to the plurality of second detection data. Next, step S415 is executed to decide at least one operation signal according to the determination result of step S413 via the processor. Then, step S417 is executed to transmit at least one operation signal to the host so that the host performs an operation according to each of the at least one operation signal by the transceiving interface.

Next, several possible implementations of the steps S413 and S415 will be illustrated, although the present invention is not limited thereto.

In some implementations, step S413 is executed to determine that the first touch object, the second touch object, the third touch object, and the fourth touch object touch the work surface within the second time interval according to the second detection data via the processor. Next, step S415 is executed to decide the first operation signal after determining that the fourth touch object touches the work surface within the second time interval so that the host performs a first operation according to the first operation signal via the processor. Furthermore, step S415 may further be executed to decide the second operation signal after determining that the first touch object, the second touch object, and the third touch object touch the work surface within the second time interval via the processor, so that the host performs the second operation according to the second operation signal.

In some implementations, step S413 is executed to determine that the fourth touch object touches the work surface within the second time interval according to the second detection data via the processor. Next, step S415 is executed to decide an operation signal after determining that the fourth touch object touches the work surface within the second time interval so that the host performs an operation according to the operation signal via the processor.

In some implementations, step S413 is executed to determine that the first touch object, the second touch object, the third touch object, the fourth touch object, the fifth touch object, and the sixth touch object touch the work surface within the second time interval according to the plurality of second detection data via the processor. Next, step S415 is executed to decide the first operation signal after determining that the fourth touch object, the fifth touch object, and the sixth touch object touch the work surface within the second time interval so that the host performs a first operation according to the first operation signal via the processor. Furthermore, step S415 may further be executed to decide the second operation signal after determining that the first touch object, the second touch object, and the third touch object touch the work surface within the second time interval so that the host performs a second operation according to the second operation signal via the processor.

In some implementations, step S413 is executed to determine that the fourth touch object, the fifth touch object, and the sixth touch object touch the work surface within the second time interval according to the plurality of second detection data via the processor. Next, step S415 is executed to decide an operation signal after determining that the fourth touch object touches the work surface within the second time interval so that the host performs an operation according to the operation signal via the processor.

In some implementations, the work surface comprised in the virtual navigation apparatus defines a first work sub-surface and second work sub-surface. The touch detection module comprised in the virtual navigation apparatus comprises a first touch detection sub-module and a second touch detection sub-module. The first work sub-surface and the second work sub-surface do not overlap with each other. The first touch detection sub-module corresponds to the first work sub-surface, while the second touch detection sub-module corresponds to the second work sub-surface. In such an implementation, step S401 may be implemented by the first touch detection sub-module or the second touch detection sub-module. Step S411 may be implemented by the first touch detection sub-module and/or the second touch detection sub-module after the navigation function of the virtual navigation apparatus has been activated. Now, several different examples will be illustrated as follows. However, it shall be appreciated that the scope claimed in the present invention is not limited thereto.

In an example, step S401 is executed by the first touch detection sub-module. Step S403 is executed to determine that at least three touch objects (e.g., a first touch object, a second touch object, and a third touch object) touch the first work sub-surface within the first time interval according to the plurality of first detection data via the processor. Subsequently, step S411 is executed to detect a plurality of second detection data within the second time interval via the second touch detection sub-module. Step S413 is executed to determine that the fourth touch object touches the second work sub-surface within the second time interval according to the plurality of second detection data via the processor. Step S415 is executed to decide the first operation signal after determining that the fourth touch object touches the second work sub-surface so that the host performs the first operation according to the first operation signal via the processor In the example described in the previous paragraph, while steps S411 to S415 are being executed, three corresponding steps (not shown) may additionally be executed. The first step is executed to detect a plurality of third detection data within the second time interval via the first touch detection sub-module. The second step is executed to determine that the first touch object, the second touch object, and the third touch object touch the first work sub-surface within the second time interval according to the plurality of third detection data via the processor. The third step is executed to decide the second operation signal after determining that the first touch object, the second touch object, and the third touch object touch the first work sub-surface within the second time interval so that the host performs a second operation according to the second operation signal via the processor.

Furthermore, in an example, step S401 is executed by the first touch detection sub-module. Step S403 is executed to determine that at least three touch objects (e.g., a first touch object, a second touch object, and a third touch object) touch the first work sub-surface within the first time interval according to the plurality of first detection data via the processor. Subsequently, step S411 is executed to detect a plurality of second detection data within the second time interval via the second touch detection sub-module. Step S413 is executed to determine that the fourth touch object, the fifth touch object, and the sixth touch object touch the second work sub-surface within the second time interval according to the plurality of second detection data via the second touch detection sub-module. Step S415 is executed to decide a first operation signal after determining that the fourth touch object, the fifth touch object, and the sixth touch object touch the second work sub-surface so that the host performs a first operation according to the first operation signal via the processor.

In the example described in the previous paragraph, while steps S411 to S415 are being executed, three corresponding steps (not shown) may additionally be executed. The first step is executed to detect a plurality of third detection data within the second time interval via the first touch detection sub-module. The second step is executed to determine that the first touch object, the second touch object, and the third touch object touch the first work sub-surface within the second time interval according to the plurality of third detection data via the processor. The third step is executed to decide a second operation signal after determining that the first touch object, the second touch object, and the third touch object touch the first work sub-surface within the second time interval so that the host performs a second operation according to the second operation signal via the processor.

Further, in some implementations, another step (not shown) in addition to the steps S401~S417 may further be executed to determine whether a touch object on the work surface is a human finger. In such implementations, step S405 is executed to determine that the first touch object moves from a first position on the work surface to a second position on the work surface, the second touch object moves from a third position on the work surface to a fourth position on the work surface, and the third touch object moves from a fifth position on the work surface to a sixth position on the work surface within the first time interval according to the plurality of first detection data. Thereafter, step (not shown) is executed to determine that each of the first touch object, the second touch object, and the third touch object is a human finger according to the first spatial relation between the first position, the third position, and the fifth position and the second spatial relation between the second position, the fourth position, and the sixth position via the processor.

In addition to the aforesaid steps, the sixth embodiment can also execute all the operations and functions set forth in the first to fifth embodiments. The method in which the sixth embodiment executes these operations and functions can be readily appreciated by those of ordinary skill in the art based on the explanation of the first to the fifth embodiments, and thus, will not be further described herein.

Furthermore, the navigation method described in the sixth embodiment may be implemented by a non-transitory computer readable medium. When the non-transitory computer readable medium is loaded into a virtual navigation apparatus and a plurality of codes comprised therein is executed, the navigation method described in the sixth embodiment can be accomplished. The aforesaid non-transitory computer readable medium may be a file capable of being transmitted in a network, and may also be stored in a computer-readable record medium such as a read only memory (ROM), a flash memory, a floppy disk, a hard disk, a compact disk, a mobile disk, a magnetic tape, a database accessible to networks, or any other storage media with the same function and well known to those skilled in the art.

As can be known from the above descriptions, the present invention achieves the purpose of navigation by means of an apparatus with a work surface, touch detection module and processor. According to the present invention, a plurality of detection data is detected through the touch detection module. If at least three touch objects are determined to have touched the work surface within a time interval, then, a position signal is further decided so that a host can move the cursor on a screen according to the position signal. Because the present invention achieves the purpose of navigation by means of an apparatus with a work surface, a touch detection module and a processor without the need of a conventional mouse or an optical mouse, the apparatus can be conveniently carried by the user.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A virtual navigation apparatus, comprising:
   a work surface;
   a touch detection module, being electrically connected to the work surface and configured to detect a plurality of first detection data within a first time interval; and
   a processor, being electrically connected to the touch detection module and configured to:
   determine that at least three touch objects touch the work surface within the first time interval according to the plurality of first detection data, determine a movement datum for each touch object according to the plurality of first detection data, and decide a position signal according to the plurality of movement data so that a host moves a cursor on a screen according to the position signal,
   wherein the processor is further configured to define a polygon according to a plurality of positions where the at least three touch objects touch the work surface, and decide a moving direction of the position signal and a moving distance of the position signal according to a change of an area of the polygon within the first time interval.

2. The virtual navigation apparatus of claim 1, further comprising:
   a transceiving interface, being connected to the host and configured to transmit the position signal to the host.

3. The virtual navigation apparatus of claim 1, wherein the at least three touch objects comprise a first touch object, a second touch object, and a third touch object, the processor determines that the first touch object moves from a first position on the work surface to a second position on the work surface within the first time interval according to the plurality of first detection data, the processor determines that the second touch object moves from a third position on the work surface to a fourth position on the work surface within the first time interval according to the plurality of first detection data, the processor determines that the third touch object moves from a fifth position on the work surface to a sixth position on the work surface within the first time interval according to the plurality of first detection data, the processor calculates a first distance between the first position and the second position, a second distance between the third position and the fourth position, and a third distance between the fifth position and the sixth position, the processor calculates an average value of the first distance, the second distance, and the third distance, and the processor sets the position signal to be the average value.

4. The virtual navigation apparatus of claim 1, wherein the at least three touch objects comprise a first touch object, a second touch object, and a third touch object, the processor determines that the first touch object moves from a first position on the work surface to a second position on the work surface within the first time interval according to the plurality of first detection data, the processor determines that the second touch object moves from a third position on the work surface to a fourth position on the work surface within the first time interval according to the plurality of first detection data, the processor determines that the third touch object moves from a fifth position on the work surface to a sixth position on the work surface within the first time interval according to the plurality of first detection data, the processor calculates a first average value of the first position, the third position, and the fifth position, the processor calculates a second average value of the second position, the fourth position, and the sixth position, the processor further calculates a difference value between the second average value and the first average value, and the processor sets the position signal to be the difference value.

5. The virtual navigation apparatus of claim 1, wherein each of the at least three touch objects has a moving track on the work surface within the first time interval, the processor decides the moving direction of the position signal according to the moving tracks, and the processor sets the moving distance of the position signal to be an average value of the moving tracks.

6. The virtual navigation apparatus of claim 5, wherein the moving direction is used by the host for controlling one of a visual variation, an audio variation, and a combination thereof.

7. The virtual navigation apparatus of claim 6, wherein the visual variation comprises one of a rotation, an enlargement, a shrink, and the combination thereof of a display area on the screen, and the display area displays one of a drawing, a window, a cursor, and a combination thereof.

8. The virtual navigation apparatus of claim 6, wherein the audio variation comprises one of volume control, choice of sound effects, sound mixing, and a combination thereof.

9. The virtual navigation apparatus of claim 1, wherein the moving direction is used by the host for controlling one of a visual variation, an audio variation, and a combination thereof.

10. The virtual navigation apparatus of claim 1, wherein the work surface is not flat.

11. The virtual navigation apparatus of claim 1, wherein the at least three touch objects comprise a first touch object, a second touch object, and a third touch object, the work surface defines a first work sub-surface and a second work sub-surface, the first work sub-surface and the second work sub-surface do not overlap with each other, the touch detection module comprises a first touch detection sub-module and a second touch detection sub-module, the first touch detection sub-module corresponds to the first work sub-surface, the second touch detection sub-module corresponds to the second work sub-surface, the first touch object, the second touch object, and the third touch object touch the first work sub-surface within the first time interval, the second touch detection sub-module detects a plurality of second detection data within a second time interval, the second time interval is later than the first time interval, the processor further determines that a fourth touch object touches the second work sub-surface within the second time interval according to the plurality of second detection data, and the processor further decides a first operation signal after determining that the fourth touch object touches the second work sub-surface so that the host performs a first operation according to the first operation signal.

12. The virtual navigation apparatus of claim 11, wherein the first touch detection sub-module further detects a plurality of third detection data within the second time interval, the processor further determines that the first touch object, the second touch object, and the third touch object touch the first work sub-surface within the second time interval according to the plurality of third detection data, and the processor further decides a second operation signal after determining that the first touch object, the second touch object, and the third touch object touch the first work sub-surface within the second time interval so that the host performs a second operation according to the second operation signal.

13. The virtual navigation apparatus of claim 1, wherein the at least three touch objects comprise a first touch object, a second touch object, and a third touch object, the touch detection module further detects a plurality of second detection data within a second time interval, the second time interval is later than the first time interval, the processor further determines that the first touch object, the second touch object, the third touch object, and a fourth touch object touch the work surface within the second time interval according to the plurality of second detection data, and the processor further decides a first operation signal after determining that the fourth touch object touches the work surface so that the host performs a first operation according to the first operation signal.

14. The virtual navigation apparatus of claim 13, wherein the processor further decides a second operation signal after determining that the first touch object, the second touch object, and the third touch object touch the work surface within the second time interval so that the host performs a second operation according the second operation signal.

15. The virtual navigation apparatus of claim 1, wherein the at least three touch objects comprise a first touch object, a second touch object, and a third touch object, the touch detection module further detects a plurality of second detection data within a second time interval, the second time interval is later than the first time interval, the processor further determines that a fourth touch object touches the work surface within the second time interval according to the plurality of second detection data, and the processor further decides an operation signal after determining that the fourth touch object touches the work surface so that the host performs an operation according to the operation signal.

16. The virtual navigation apparatus of claim 1, wherein the at least three touch objects comprise a first touch object, a second touch object, and a third touch object, the work surface defines a first work sub-surface and a second work sub-surface, the first work sub-surface and the second work sub-surface do not overlap with each other, the touch detection module comprises a first touch detection sub-module and a second touch detection sub-module, the first touch detection sub-module corresponds to the first work sub-surface, the second touch detection sub-module corresponds to the second work sub-surface, the first touch object, the second touch object, and the third touch object touch the first work sub-surface within the first time interval, the second touch detection sub-module detects a plurality of second detection data within a second time interval, the second time interval is later than the first time interval, the processor further determines that a fourth touch object, a fifth touch object, and a sixth touch object touch the second work sub-surface within the second time interval according to the plurality of second detection data, and the processor further decides a first operation signal after determining that the fourth touch object, the fifth touch object, and the sixth touch object touch the second work sub-surface so that the host performs a first operation according to the first operation signal.

17. The virtual navigation apparatus of claim 16, wherein the first touch detection sub-module further detects a plurality of third detection data within the second time interval, the processor further determines that the first touch object, the second touch object, and the third touch object touch the first work sub-surface within the second time interval according to the plurality of third detection data, and the processor further decides a second operation signal after determining that the first touch object, the second touch object, and the third touch object touch the first work sub-surface within the second time interval so that the host performs a second operation according to the second operation signal.

18. The virtual navigation apparatus of claim 1, wherein the at least three touch objects comprise a first touch object, a second touch object, and a third touch object, the touch detection module further detects a plurality of second detection data within a second time interval, the second time interval is later than the first time interval, the processor further determines that the first touch object, the second touch object, the third touch object, a fourth touch object, a fifth touch object, and a sixth touch object touch the work surface within the second time interval according to the plurality of second detection data, and the processor further decides a first operation signal after determining that the fourth touch object, the fifth touch object, and the sixth touch object touch the work surface so that the host performs a first operation according to the first operation signal.

19. The virtual navigation apparatus of claim 18, wherein the processor further decides a second operation signal after determining that the first touch object, the second touch object, and the third touch object touch the work surface within the second time interval so that the host performs a second operation according to the second operation signal.

20. The virtual navigation apparatus of claim 1, wherein the at least three touch objects comprise a first touch object, the second touch object, and a third touch object, the touch detection module further detects a plurality of second detection data within a second time interval, the second time interval is later than the first time interval, the processor further determines that a fourth touch object, a fifth touch object, and a sixth touch object touch the work surface within the second time interval according to the plurality of second detection data, and the processor further decides an operation signal after determining that the fourth touch object, the fifth touch object, and the sixth touch object touch the work surface so that the host performs an operation according to the operation signal.

21. The virtual navigation apparatus of claim 1, wherein the at least three touch objects comprise a first touch object, a second touch object, and a third touch object, the processor determines that the first touch object moves from a first position on the work surface to a second position on the work surface, the second touch object moves from a third position on the work surface to a fourth position on the work surface, and the third touch object moves from a fifth position on the work surface to a sixth position on the work surface within the first time interval according to the plurality of first detection data, and the processor further determines that each of the first touch object, the second touch object, and the third touch object is a human finger according to a first spatial relation between the first position, the third position, and the fifth position and a second spatial relation between the second position, the fourth position, and the sixth position.

22. A navigation method, being adapted to be used in a virtual navigation apparatus, the virtual navigation apparatus comprising a work surface, a touch detection module, and a processor, the navigation method comprising the following steps of:
(a) detecting, by the touch detection module, a plurality of first detection data within a first time interval;
(b) determining, by the processor, that at least three touch objects touch the work surface within the first time interval according to the plurality of first detection data;
(c) determining, by the processor, a movement datum for each touch object according to the plurality of first detection data, comprising the following step of:
defining, by the processor, a polygon according to a plurality of positions where the at least three touch objects touch the work surface; and
determining, by the processor, a change of an area of the polygon within the first time interval;
(d) deciding, by the processor, a position signal according to the plurality of movement data so that a host moves a cursor on a screen according to the position signal;
wherein the step (d) decides, by the processor, a moving direction of the position signal and a moving distance of the position signal according to the change of the area.

23. The navigation method of claim 22, wherein the virtual navigation apparatus further comprises a transceiving interface and the navigation method further comprises the following step of:
transmitting, by the transceiving interface, the position signal to the host.

24. The navigation method of claim 22, wherein the at least three touch objects comprise a first touch object, a second touch object, and a third touch object, the step (c) determines, by the processor, that the first touch object moves from a first position on the work surface to a second position on the work surface, the second touch object moves from a third position on the work surface to a fourth position on the work surface, and the third touch object moves from a fifth position on the work surface to a sixth position on the work surface within the first time interval according to the plurality of first detection data, and the step (d) comprises the following steps of:
calculating, by the processor, a first distance between the first position and the second position;
calculating, by the processor, a second distance between the third position and the fourth position;
calculating, by the processor, a third distance between the fifth position and the sixth position;
calculating, by the processor, an average value of the first distance, the second distance, and the third distance; and
setting, by the processor, the position signal to be the average value.

25. The navigation method of claim 22, wherein the at least three touch objects comprise a first touch object, a second touch object, and a third touch object, the step (c) determines, by the processor, that the first touch object moves from a first position on the work surface to a second position on the work surface, the second touch object moves from a third position on the work surface to a fourth position on the work surface, and the third touch object moves from a fifth position on the work surface to a sixth position on the work surface within the first time interval according to the plurality of first detection data, and the step (d) comprises the following steps of:
calculating, by the processor, a first average value of the first position, the third position, and the fifth position;

calculating, by the processor, a second average value of the second position, the fourth position, and the sixth position;

calculating, by the processor, a difference value between the second average value and the first average value; and setting, by the processor, the position signal to be the difference value.

26. The navigation method of claim 25, wherein the moving direction is used by the host for controlling one of a visual variation, an audio variation, and a combination thereof.

27. The navigation method of claim 22, wherein the step (c) determines, by the processor, a moving track on the work surface within the first time interval for each of the at least three touch objects and the step (d) comprises the following steps of:

deciding, by the processor, the moving direction of the position signal according to the moving tracks; and setting, by the processor, the moving distance of the position signal to be an average value of the moving tracks.

28. The navigation method of claim 22, wherein the moving direction is used by the host for controlling one of a visual variation, an audio variation, and a combination thereof.

29. The navigation method of claim 28, wherein the visual variation comprises one of a rotation, an enlargement, a shrink, and the combination thereof of a display area on the screen and the display area displays one of a drawing, a window, a cursor, and a combination thereof.

30. The navigation method of claim 28, wherein the audio variation comprises one of volume control, choice of sound effects, sound mixing, and a combination thereof.

31. The navigation method of claim 22, wherein the at least three touch objects comprise a first touch object, a second touch object, and a third touch object, the work surface defines a first work sub-surface and a second work sub-surface, the first work sub-surface and the second work sub-surface do not overlap with each other, the touch detection module comprises a first touch detection sub-module and a second touch detection sub-module, the first touch detection sub-module corresponds to the first work sub-surface, the second touch detection sub-module corresponds to the second work sub-surface, the first touch object, the second touch object, and the third touch object touch the first work sub-surface within the first time interval, and the navigation method further comprises the following steps of:

detecting, by the second touch detection sub-module, a plurality of second detection data within a second time interval, wherein the second time interval is later than the first time interval;

determining, by the processor, that a fourth touch object touches the second work sub-surface within the second time interval according to the plurality of second detection data; and deciding, by the processor, a first operation signal after determining that the fourth touch object touches the second work sub-surface so that the host performs a first operation according to the first operation signal.

32. The navigation method of claim 31, further comprising the following steps of:

detecting, by the first touch detection sub-module, a plurality of third detection data within the second time interval;

determining, by the processor, that the first touch object, the second touch object, and the third touch object touch the first work sub-surface within the second time interval according to the plurality of third detection data; and deciding, by the processor, a second operation signal after determining that the first touch object, the second touch object, and the third touch object touch the first work sub-surface within the second time interval so that the host performs a second operation according to the second operation signal.

33. The navigation method of claim 22, wherein the at least three touch objects comprise a first touch object, a second touch object, and a third touch object and the navigation method further comprises the following steps of:

detecting, by the touch detection module, a plurality of second detection data within a second time interval, wherein the second time interval is later than the first time interval;

determining, by the processor, that the first touch object, the second touch object, the third touch object, and a fourth touch object touch the work surface within the second time interval according to the plurality of second detection data; and deciding, by the processor, a first operation signal after determining that the fourth touch object touches the work surface so that the host performs a first operation according to the first operation signal.

34. The navigation method of claim 33, further comprising the following step of:

deciding, by the processor, a second operation signal after determining that the first touch object, the second touch object, and the third touch object touch the work surface within the second time interval so that the host performs a second operation according the second operation signal.

35. The navigation method of claim 22, wherein the at least three touch objects comprise a first touch object, a second touch object, and a third touch object and the navigation method further comprises the following steps of:

detecting, by the touch detection module, a plurality of second detection data within a second time interval, wherein the second time interval is later than the first time interval;

determining, by the processor, that a fourth touch object touches the work surface within the second time interval according to the plurality of second detection data; and deciding, by the processor, an operation signal after determining that the fourth touch object touches the work surface so that the host performs an operation according to the operation signal.

36. The navigation method of claim 22, wherein the at least three touch objects comprise a first touch object, a second touch object, and a third touch object, the work surface defines a first work sub-surface and a second work sub-surface, the first work sub-surface and the second work sub-surface do not overlap with each other, the touch detection module comprises a first touch detection sub-module and a second touch detection sub-module, the first touch detection sub-module corresponds to the first work sub-surface, the second touch detection sub-module corresponds to the second work sub-surface, the first touch object, the second touch object, and the third touch object touch the first work sub-surface within the first time interval, and the navigation method further comprises the following steps of:

detecting, by the second touch detection sub-module, a plurality of second detection data within a second time interval, wherein the second time interval is later than the first time interval;
determining, by the processor, that a fourth touch object, a fifth touch object, and a sixth touch object touch the second work sub-surface within the second time interval according to the plurality of second detection data; and
deciding, by the processor, a first operation signal after determining that the fourth touch object, the fifth touch object, and the sixth touch object touch the second work sub-surface so that the host performs a first operation according to the first operation signal.

37. The navigation method of claim 36, further comprising the following steps of:
detecting, by the first touch detection sub-module, a plurality of third detection data within the second time interval;
determining, by the processor, that the first touch object, the second touch object, and the third touch object touch the first work sub-surface within the second time interval according to the plurality of third detection data; and
deciding, by the processor, a second operation signal after determining that the first touch object, the second touch object, and the third touch object touch the first work sub-surface within the second time interval so that the host performs a second operation according to the second operation signal.

38. The navigation method of claim 22, wherein the at least three touch objects comprise a first touch object, a second touch object, and a third touch object and the navigation method further comprises the following steps of:
detecting, by the touch detection module, a plurality of second detection data within a second time interval, wherein the second time interval is later than the first time interval;
determining, by the processor, that the first touch object, the second touch object, the third touch object, a fourth touch object, a fifth touch object, and a sixth touch object touch the work surface within the second time interval according to the plurality of second detection data; and
deciding, by the processor, a first operation signal after determining that the fourth touch object, the fifth touch object, and the sixth touch object touch the work surface so that the host performs a first operation according to the first operation signal.

39. The navigation method of claim 38, further comprising the following steps of:
deciding, by the processor, a second operation signal after determining that the first touch object, the second touch object, and the third touch object touch the first work sub-surface within the second time interval so that the host performs a second operation according to the second operation signal.

40. The navigation method of claim 22, wherein the at least three touch objects comprise a first touch object, a second touch object, and a third touch object and the navigation method further comprises the following steps of:

detecting, by the touch detection module, a plurality of second detection data within a second time interval, wherein the second time interval is later than the first time interval;
determining, by the processor, a fourth touch object, a fifth touch object, and a sixth touch object touch the work surface within the second time interval according to the plurality of second detection data; and
deciding, by the processor, an operation signal after determining that the fourth touch object, the fifth touch object, and the sixth touch object touch the work surface so that the host performs an operation according to the operation signal.

41. The navigation method of claim 22, wherein the at least three touch objects comprise a first touch object, a second touch object, and a third touch object, the step (c) determines, by the processor, that the first touch object moves from a first position on the work surface to a second position on the work surface, the second touch object moves from a third position on the work surface to a fourth position on the work surface, and the third touch object moves from a fifth position on the work surface to a sixth position on the work surface within the first time interval according to the plurality of first detection data, and the navigation method further comprises the following step of:
determining, by the processor, that each of the first touch object, the second touch object, and the third touch object is a human finger according to a first spatial relation between the first position, the third position, and the fifth position and a second spatial relation between the second position, the fourth position, and the sixth position.

42. A non-transitory computer readable medium, having a computer program stored therein, the computer program executing a navigation method after being loaded into a virtual navigation apparatus, and the computer program comprising:
code A for detecting a plurality of detection data within a time interval by a touch detection module of the virtual navigation apparatus;
code B for determining that at least three touch objects touch the work surface within the time interval according to the plurality of detection data by a processor of the virtual navigation apparatus;
code C for determining a movement datum for each touch object according to the plurality of detection data by the processor, comprising:code for defining a polygon according to a plurality of positions where the at least three touch objects touch the work surface; and
code for determining a change of an area of the polygon within the first time interval;
code D for deciding a position signal according to the plurality of movement data by the processor so that a host moves a cursor on a screen according to the position signal;
wherein the code D decides a moving direction of the position signal and a moving distance of the position signal according to the change of the area.

\* \* \* \* \*